(12) United States Patent
Ammanamanchi et al.

(10) Patent No.: US 12,483,149 B2
(45) Date of Patent: Nov. 25, 2025

(54) SYSTEMS AND METHODS FOR CONFIGURABLE PRIMARY AND SECONDARY DC-DC CONVERTER AND BATTERY CHARGER

(71) Applicant: BorgWarner Luxembourg Automotive Systems S.A., Bascharage (LU)

(72) Inventors: Venkata Jaya Sai Praneeth Ammanamanchi, Lamadelaine (LU); Alexandre M.S. Reis, Westfield, IN (US); Julien Schmitt, Kuntzig (FR)

(73) Assignee: BorgWarner Luxembourg Automotive Systems S.A., Bascharage (LU)

( * ) Notice: Subject to any disclaimer, the term of this patent is extended or adjusted under 35 U.S.C. 154(b) by 862 days.

(21) Appl. No.: 17/663,994

(22) Filed: May 18, 2022

(65) Prior Publication Data

US 2023/0378879 A1    Nov. 23, 2023

(51) Int. Cl.
*H02J 7/16* (2006.01)
*H02J 7/00* (2006.01)
(Continued)

(52) U.S. Cl.
CPC ... *H02M 3/33573* (2021.05); *H02J 7/007182* (2020.01); *H02J 7/06* (2013.01);
(Continued)

(58) Field of Classification Search
None
See application file for complete search history.

(56) References Cited

U.S. PATENT DOCUMENTS

| 7,030,512 B2 | 4/2006 | Krein |
| 2018/0222333 A1 | 8/2018 | Khaligh et al. |

(Continued)

FOREIGN PATENT DOCUMENTS

| CN | 102195330 A | 9/2011 |
| DE | 102017213145 A1 | 1/2019 |
| WO | 2021051776 A1 | 3/2021 |

OTHER PUBLICATIONS

Deshang Sha, Zhiqiang Guo and Xiaozhong Liao, Control Strategy for Input-Parallel-Output-Parallel Connected High Frequency Isolated Inverter Modules, IEEE Transactions On Power Electronics, vol. 26, No. 8, Aug. 2011, pp. 2237-2248, China.

(Continued)

*Primary Examiner* — Arun C Williams
(74) *Attorney, Agent, or Firm* — Joshua M. Haines; Bookoff McAndrews, PLLC

(57) ABSTRACT

A system for a direct current (DC) to DC converter, the system comprising one or more transformers, a first bridge driver connected to a primary side of the one or more transformers, a second bridge driver connected to a primary side of the one or more transformers, one or more primary configuration switches operable to configure the first bridge driver and the second bridge driver into each of a single driver configuration, a parallel driver configuration, and a series driver configuration, a first bridge rectifier connected to a secondary side of the one or more transformers, a second bridge rectifier connected to the secondary side of the one or more transformers, and one or more secondary configuration (Continued)

switches operable to configure the first bridge rectifier and the second bridge rectifier into each of a single rectifier configuration, a parallel rectifier configuration, and a series rectifier configuration.

20 Claims, 13 Drawing Sheets

(51) Int. Cl.
    *H02J 7/06* (2006.01)
    *H02M 1/088* (2006.01)
    *H02M 3/335* (2006.01)
    *B60L 53/14* (2019.01)
    *B60L 53/60* (2019.01)
    *H02M 1/42* (2007.01)

(52) U.S. Cl.
    CPC ....... *H02M 1/088* (2013.01); *H02M 3/33584* (2013.01); *B60L 53/14* (2019.02); *B60L 53/60* (2019.02); *B60L 2210/10* (2013.01); *H02J 2207/20* (2020.01); *H02M 1/4208* (2013.01)

(56) References Cited

U.S. PATENT DOCUMENTS

| | | | |
|---|---|---|---|
| 2021/0155100 A1 | 5/2021 | Khaligh et al. | |
| 2022/0041075 A1* | 2/2022 | Pfeilschifter | H02M 1/007 |
| 2023/0131143 A1* | 4/2023 | Morrison | H02M 3/33573 363/68 |
| 2023/0378795 A1* | 11/2023 | Ammanamanchi | H02M 3/33573 |

OTHER PUBLICATIONS

Yuma Murakawa and Takashi Hikihara, Output Series-Parallel Connection of Passivity-Based Controlled DC-DC Converters: Generalization of Asymptotic Stability, IEEE, Jan. 28, 2021, pp. 1-10.
Zhiqiang Guo, Deshang Sha and Xiaozhong Liao, Input Voltage Sharing Control for Input-Series-Output Parallel DC-DC Converters without Input Voltage Sensors, Journal of Power Electronics, vol. 12, No. 1, JPE Dec. 1, 2011, pp. 83-87, Jan. 2012, Beijing, China.
K. Stengert, "On-board 22 KW fast charger "NLG6"," 2013 World Electric Vehicle Symposium and Exhibition (EVS27), 2013, pp. 1-11.
Extended European Search Report in EP Application No. 23170146, dated Sep. 21, 2023 (10 pages).

* cited by examiner

| CONVERTERS (PRIMARY SIDE) | CONVERTERS (SECONDARY SIDE) | OPERATION PRIMARY | OPERATION SECONDARY | MODE |
|---|---|---|---|---|
| PARALLEL | PARALLEL | FULL BRIDGE | FULL BRIDGE | LOW VOLTAGE |
| PARALLEL | SERIES | HALF BRIDGE | FULL BRIDGE | |
| PARALLEL | PARALLEL | FULL BRIDGE | FULL BRIDGE | NOMINAL VOLTAGE |
| SERIES | PARALLEL | FULL BRIDGE | FULL BRIDGE | |
| PARALLEL | SERIES | FULL BRIDGE | FULL BRIDGE | FULL VOLTAGE |
| SERIES | SERIES | FULL BRIDGE | FULL BRIDGE | |

*FIG. 10*

SYSTEMS AND METHODS FOR CONFIGURABLE PRIMARY AND SECONDARY DC-DC CONVERTER AND BATTERY CHARGER

TECHNICAL FIELD

Various embodiments of the present disclosure relate generally to systems and methods for a DC-DC converter including a configurable primary and secondary, and a battery charger including the configurable DC-DC converter for electric vehicles.

BACKGROUND

In the field of battery chargers, a two-stage layout is generally used to meet a requirement for use in automotive vehicles as an onboard charger. These onboard chargers have high power density, with less weight and require less space. The configuration layout used in single-phase or three-phase chargers includes an alternating current (AC) to direct current (DC) Power Factor Correction (PFC) converter at stage I and an isolated DC-DC converter at stage II. Battery chargers are configured for specific applications, and may not operate at a high efficiency for different power requirements.

The present disclosure is directed to overcoming one or more of these above-referenced challenges.

SUMMARY OF THE DISCLOSURE

In some aspects, the techniques described herein relate to a system for a direct current (DC) to DC converter, the system including: one or more transformers; a first bridge driver connected to a primary side of the one or more transformers; a second bridge driver connected to a primary side of the one or more transformers; one or more primary configuration switches operable to configure the first bridge driver and the second bridge driver into each of a single driver configuration, a parallel driver configuration, and a series driver configuration; a first bridge rectifier connected to a secondary side of the one or more transformers; a second bridge rectifier connected to the secondary side of the one or more transformers; and one or more secondary configuration switches operable to configure the first bridge rectifier and the second bridge rectifier into each of a single rectifier configuration, a parallel rectifier configuration, and a series rectifier configuration.

In some aspects, the techniques described herein relate to a system, further including: a controller configured to control the operation of the one or more primary configuration switches and the one or more secondary configuration switches.

In some aspects, the techniques described herein relate to a system, wherein the one or more primary configuration switches include a first primary configuration switch, a second primary configuration switch, and a third primary configuration switch, and the one or more secondary configuration switches include a first secondary configuration switch, a second secondary configuration switch, and a third secondary configuration switch.

In some aspects, the techniques described herein relate to a system, wherein the controller is configured to control the operation of the one or more primary configuration switches to configure the first bridge driver and the second bridge driver in the single driver configuration by controlling the first primary configuration switch to be open, the second primary configuration switch to be open, and the third primary configuration switch to be closed.

In some aspects, the techniques described herein relate to a system, wherein the controller is configured to control the operation of the one or more primary configuration switches to configure the first bridge driver and the second bridge driver in the parallel driver configuration by controlling the first primary configuration switch to be closed, the second primary configuration switch to be open, and the third primary configuration switch to be closed.

In some aspects, the techniques described herein relate to a system, wherein the controller is configured to control the operation of the one or more primary configuration switches to configure the first bridge driver and the second bridge driver in the series driver configuration by controlling the first primary configuration switch to be open, the second primary configuration switch to be closed, and the third primary configuration switch to be open.

In some aspects, the techniques described herein relate to a system, wherein the controller is configured to control the operation of the one or more secondary configuration switches to configure the first bridge rectifier and the second bridge rectifier in the single rectifier configuration by controlling the first secondary configuration switch to be open, the second secondary configuration switch to be open, and the third secondary configuration switch to be closed.

In some aspects, the techniques described herein relate to a system, wherein the controller is configured to control the operation of the one or more secondary configuration switches to configure the first bridge rectifier and the second bridge rectifier in the parallel rectifier configuration by controlling the first secondary configuration switch to be closed, the second secondary configuration switch to be open, and the third secondary configuration switch to be closed.

In some aspects, the techniques described herein relate to a system, wherein the controller is configured to control the operation of the one or more secondary configuration switches to configure the first bridge rectifier and the second bridge rectifier in the series rectifier configuration by controlling the first secondary configuration switch to be open, the second secondary configuration switch to be closed, and the third secondary configuration switch to be open.

In some aspects, the techniques described herein relate to a system, further including: wherein the controller is further configured to control the operation of the one or more primary configuration switches and the one or more secondary configuration switches to configure the first bridge driver, second bridge driver, first bridge rectifier, and second bridge rectifier based on a sensed voltage of a battery connected to the DC-DC converter being in a low voltage region, a nominal voltage region, or a full voltage region.

In some aspects, the techniques described herein relate to a system, wherein the controller is further configured to control the operation of one or more of the first bridge driver and second bridge driver to operate in each of a half-bridge driver configuration and in a full-bridge driver configuration.

In some aspects, the techniques described herein relate to a system, wherein the controller is further configured to turn off switches of the second bridge driver in the single driver configuration, and to turn off switches of the second bridge rectifier in the single rectifier configuration.

In some aspects, the techniques described herein relate to a system, further including: an alternating current (AC) to direct current (DC) Power Factor Correction (PFC) converter connected to the bridge driver to provide the system as a battery charger, and a battery connected to the DC-DC converter of the battery charger, wherein the battery charger is configured to: receive input AC power through the PFC converter, convert the AC power to DC power, and provide the DC power to the battery to charge the battery, and receive DC power from the battery through the DC-DC converter, convert the DC power to AC power, and provide the AC power through the PFC converter as output AC power.

In some aspects, the techniques described herein relate to a system, wherein the one or more transformers includes one or more high-frequency transformers provided in a resonant tank including one or more of a multiple winding transformer or multiple transformers.

In some aspects, the techniques described herein relate to a method for controlling a system including a direct current (DC) to DC converter including one or more transformers, a first bridge driver, a second bridge driver, one or more primary configuration switches, a first bridge rectifier, a second bridge rectifier, and one or more secondary configuration switches, the method including performing, by a controller, operations including: controlling a switching operation of the one or more primary configuration switches to configure the first bridge driver and the second bridge driver into each of a single driver configuration, a parallel driver configuration, and a series driver configuration; and controlling a switching operation of the one or more secondary configuration switches to configure the first bridge rectifier and the second bridge rectifier into each of a single rectifier configuration, a parallel rectifier configuration, and a series rectifier configuration.

In some aspects, the techniques described herein relate to a method, wherein the operations further include receiving a sensed voltage of a battery connected to the DC-DC converter, and wherein the controlling the switching operation includes controlling the switching operation to configure the first bridge driver, second bridge driver, first bridge rectifier, and second bridge rectifier based on the sensed voltage of the battery connected to the DC-DC converter being in a low voltage region, a nominal voltage region, or a full voltage region.

In some aspects, the techniques described herein relate to a method, wherein the operations further include controlling the operation of one or more of the first bridge driver and second bridge driver to operate in each of a half-bridge driver configuration and in a full-bridge driver configuration.

In some aspects, the techniques described herein relate to a method, wherein the controlling the switching operation of the one or more primary configuration switches to configure the first bridge driver and the second bridge driver in the single driver configuration includes turning off switches of the second bridge driver, and wherein the controlling the switching operation of the one or more secondary configuration switches to configure the first bridge rectifier and the second bridge rectifier in the single rectifier configuration includes turning off switches of the second bridge rectifier.

In some aspects, the techniques described herein relate to a method, wherein the controlling the switching operation further includes: receiving input AC power, converting the AC power to DC power, and providing the DC power to a battery to charge the battery, and receiving DC power from the battery, converting the DC power to AC power, and providing the AC power as output AC power.

In some aspects, the techniques described herein relate to a non-transitory computer readable medium storing instructions that, when executed by one or more processors, perform operations including: controlling a switching operation of one or more primary configuration switches to configure a first bridge driver and a second bridge driver into each of a single driver configuration, a parallel driver configuration, and a series driver configuration; and controlling a switching operation of one or more secondary configuration switches to configure a first bridge rectifier and a second bridge rectifier into each of a single rectifier configuration, a parallel rectifier configuration, and a series rectifier configuration.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to at least some of the disclosed systems and methods is a charger that may operate with a wide range of input voltages and generate a wide range of output voltages. The disclosed systems and methods discussed below may operate with a wide range of input voltages and generate a wide range of output voltages.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 10 depicts a variety of example configurations for a battery charger with a configurable DC-DC converter, according to one or more embodiments.

DETAILED DESCRIPTION OF EMBODIMENTS

Figure 1:
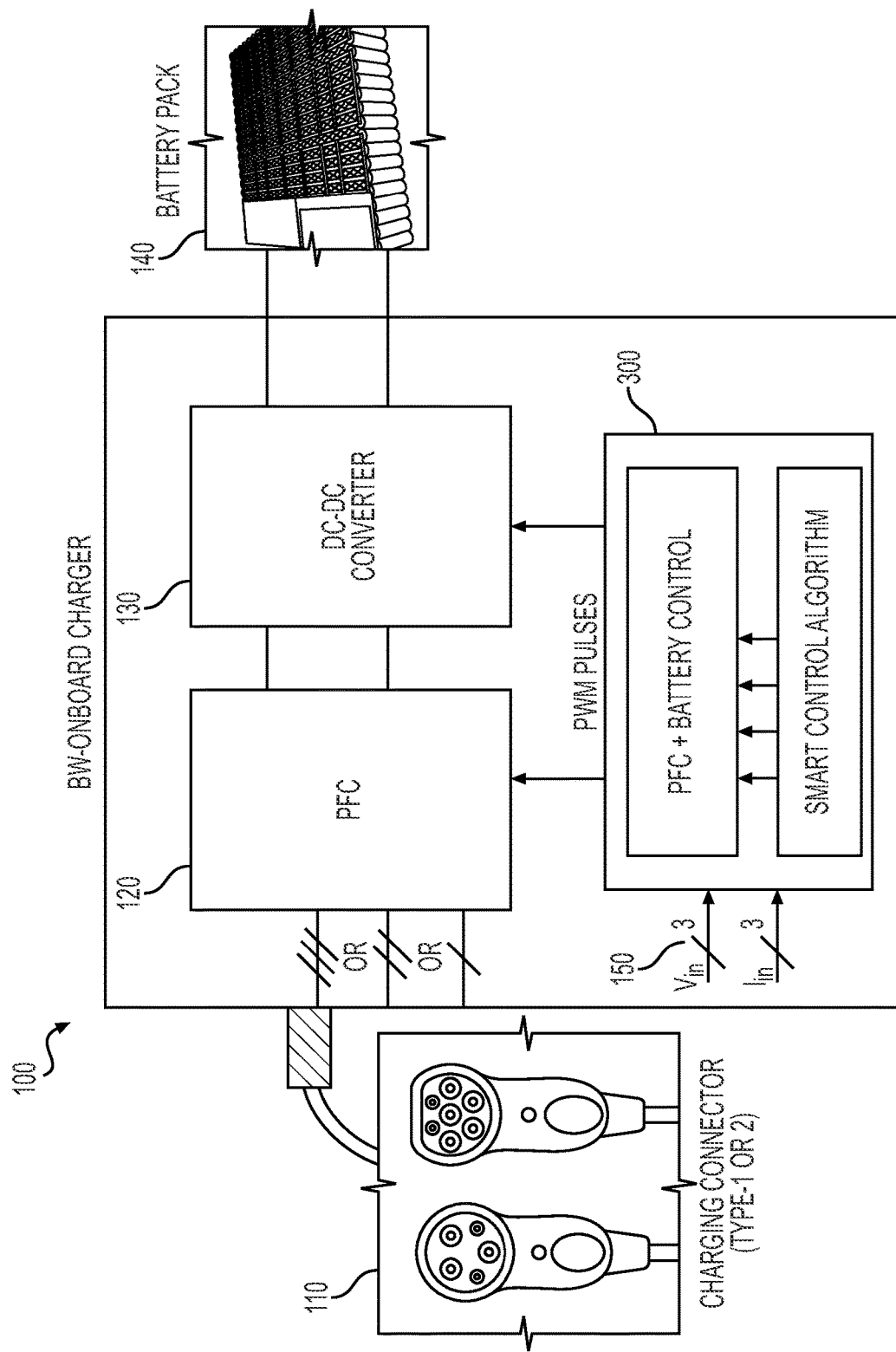
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for a configurable DC-DC converter, and a battery charger including the configurable DC-DC converter for electric vehicles.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The move in the automotive industry from 400 V to 800 V has created several issues for achieving high efficiency with better power density capabilities. A system with a three-phase input power supply achieving charging capabilities at lower battery voltages is difficult. The few chargers with LLC converters that are compatible with single-phase and three-phase input supply have limitations on the voltage range levels at the input side and at the battery side. An onboard charger with a wide output when a wide range of three-phase input voltages is applied is crucial for component manufacturers. The power levels of onboard chargers are increasing up to 11 kW or 22 kW, and need to be operated with both single-phase and three-phase grid input supply. A potential implementation is to dynamically change the PFC Stage output voltage and the DC-DC stage gain. Unfortunately, due to the wide range of single-phase and three phase input voltages, it is not always possible to impose the desired PFC Stage output voltage. An isolated DC-DC converter used in this structure provides limited power operation in some voltage ranges. On the other side, it is possible to control the gain of the DC-DC converter. Unfortunately, to achieve a good efficiency and a limited power dissipation, it is preferable to use a resonant converter, which must be operated around a resonant frequency. This limitation drastically limits the range of the gain of the DC-DC converter which can be controlled.

A battery charger according to the disclosure may operate with multiple types of AC input power supplies, including single phase, split/dual/two phase, and three-phase power supplies. The charger may be compatible with a wide range of operation. The algorithms may ensure the operation of the converter with wide variations in input voltages to generate a wide range of output voltages. A Capacitor-Inductor-Inductor-Inductor-Capacitor (CLLLC) converter may be used as a second stage converter using a DC link voltage generated from the PFC as the input voltage for the converter. However, the disclosure is not limited thereto.

Figure 2:
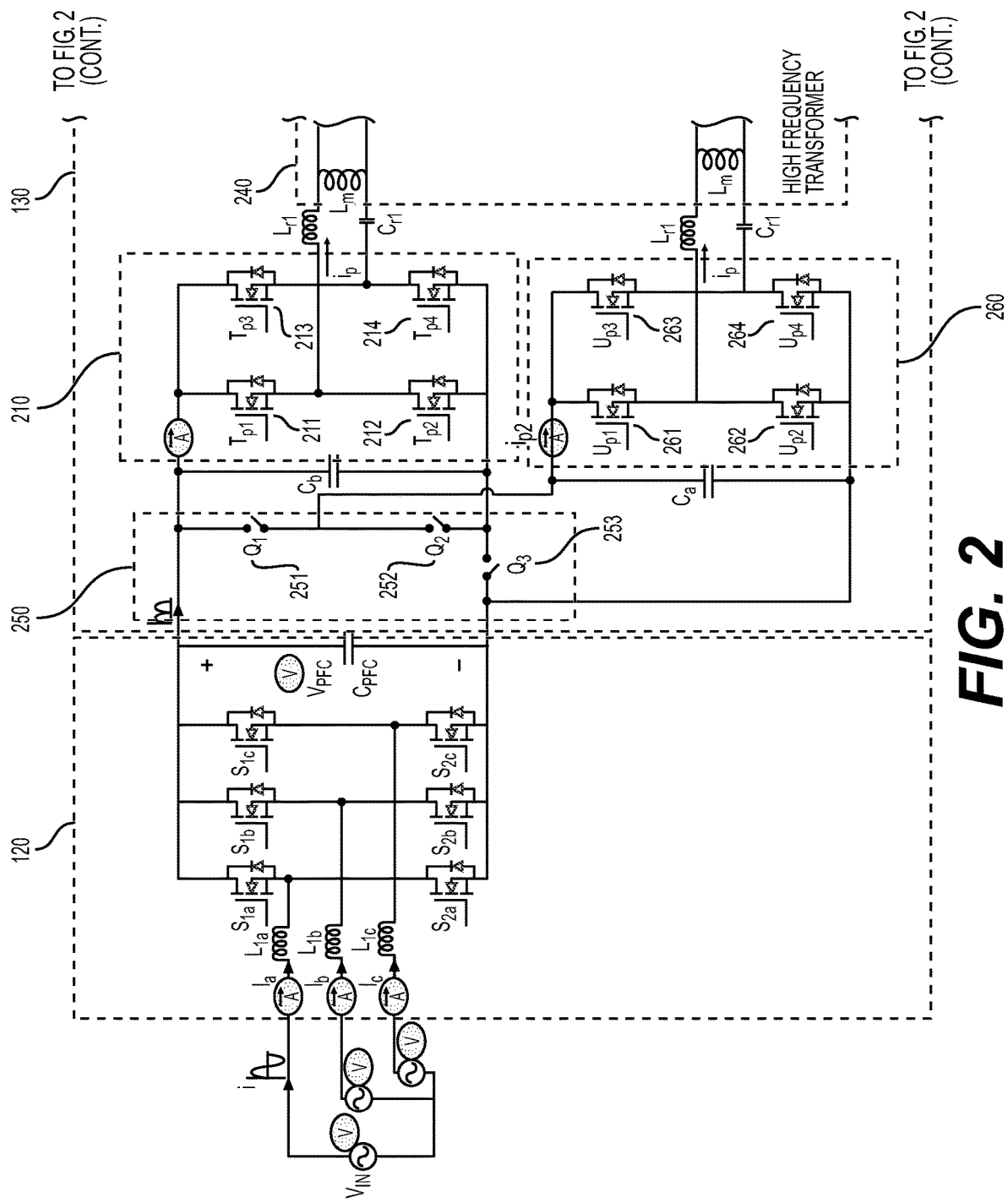
FIG. 2 depicts an exemplary electrical schematic for a battery charger with a configurable DC-DC converter, according to one or more embodiments.
Figure 2:
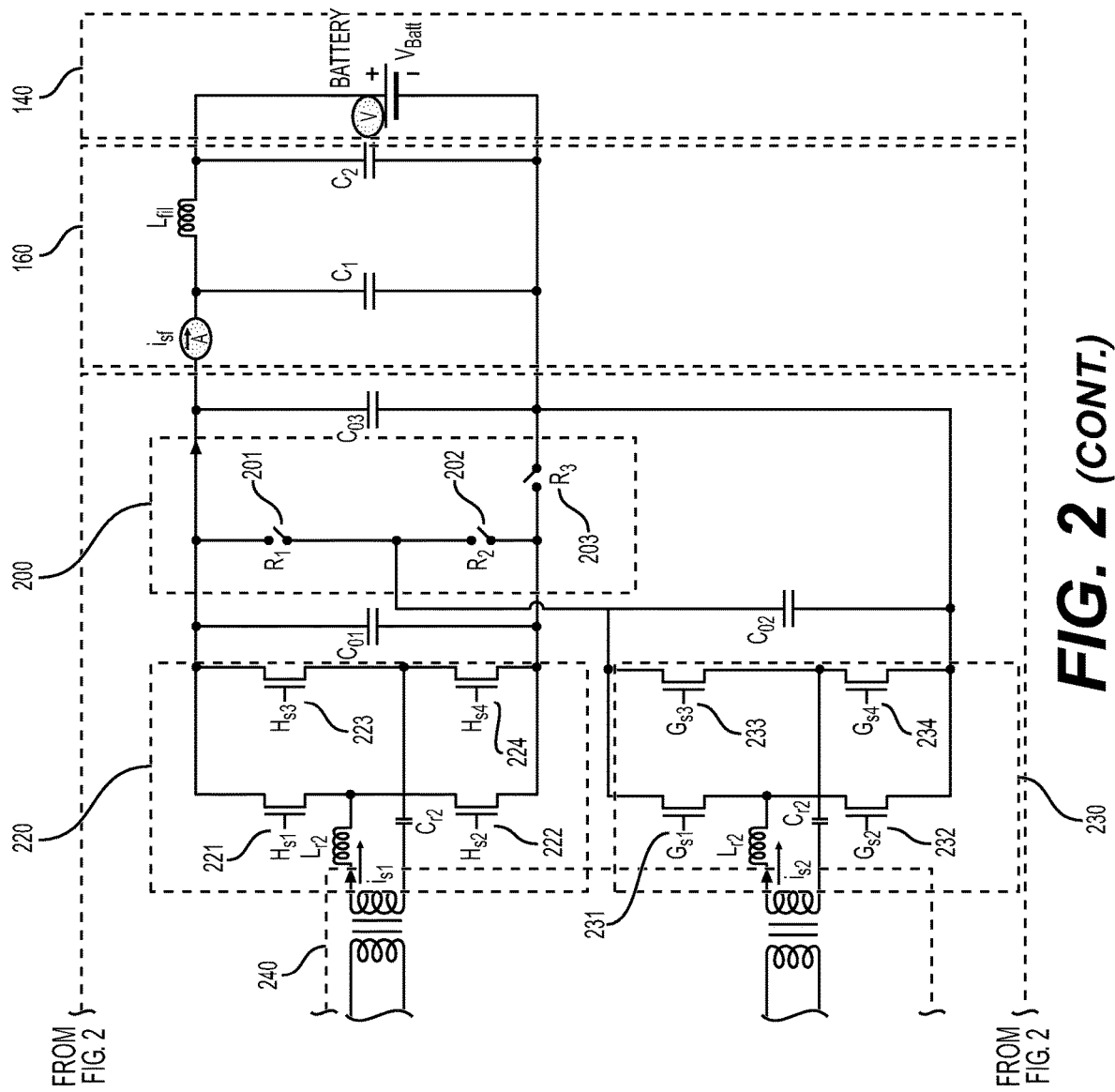

A battery charger according to the disclosure may possess higher efficiency without output voltage or power limitation. An algorithm according to the disclosure may provide operation of the configurable DC-DC converter for different battery voltages. As shown in FIG. 2, the input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery back from minimum voltage to maximum voltage. With a three-phase input voltage, the minimum DC link voltage that can be achieved may be approximately 588 V with a nominal AC input voltage of 240 $V_{rms}$. At a minimum voltage, for example, of 380 V for an 800 V battery pack with a maximum battery pack voltage of 850-925 V, the output of the charger may be difficult to achieve with conventional chargers. Modifications on transformers (turns ratio), resonant tank components (inductors and capacitors), or modes of operation (half-bridge and full-bridge) increase size and primary current yields of chargers.

A battery charger according to the disclosure may have two transformers to distribute the desired output voltage. A single transformer with two primaries and two secondaries may be used to improve the power density. Various switches connected to the converter may deactivate one of the full bridge drivers when the bridge driver is not in operation and activate single, series, or parallel combinations in operation. Various switches connected to the converter may deactivate one of the full bridge rectifiers when the bridge rectifier is not in operation and activate single, series, or parallel combinations in operation. These switches may be electrical, such as MOSFETs or IGBTs, for example, or may be mechanical devices, such as relays, for example. During the higher output voltages to optimize the system to achieve better efficiency, the switches may be turned off and turned on to form a series combination of the converter with voltage divided by the switches.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) operation may be achieved with a designed control strategy for single-phase, two-phase, and three-phase systems. The switches may be any devices, such as GTO, thyristors, or MOSFETs/IGBTs with series diodes, for example. These switches may also be mechanical components (such as relays or contactors) if sufficient failure rates and arcing conditions during operation are met.

A battery charger according to the disclosure may attain lower voltage across each switch with enhanced performance for the charger, and may allow lower voltage devices on both the primary and secondary side.

FIG. 1 depicts an exemplary system infrastructure for a battery charger with a configurable DC-DC converter, according to one or more embodiments.

As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, a DC-DC converter 130, and a controller 300 receiving signals from input sensor 150. The battery charger 100 may include or be electrically connectable to a battery 140. The battery charger 100 may be used in automotive vehicles as an onboard charger to transfer power from an external power source through charging connector 110 to battery 140, or to transfer power from battery 140 in a vehicle to grid operation.

FIG. 2 depicts an exemplary electrical schematic for a battery charger with a configurable DC-DC converter, according to one or more embodiments.

As shown in FIG. 2, the PFC converter 120 according to the disclosure may operate with a three-phase input. However, PFC converter 120 may also operate with a two-phase or single-phase input.

PFC converter 120 may include inductors L1a, L2a, and L3a provided on phases A, B, and C, respectively. Capacitor Cpfc may be provided as a DC link capacitor at an output of PFC converter 120 with a voltage Vpfc to an input of DC-DC converter 130.

DC-DC converter 130 may be operable to isolate the PFC converter 120 from battery 140. For example, DC-DC converter 130 may be a CLLLC converter, or any suitable DC-DC converter.

The battery charger 100 may be a system including PFC converter 120. PFC converter 120 may include a first (e.g. A) phase switch group (e.g. switches S1a and S2a) connected to a first node from connector 110 to receive power from a first phase of a voltage source (e.g. Vin,a). The system may include a second (e.g. B) phase switch group (e.g. switches S1b and S2b) connected to a second node from connector 110 to receive power from a second phase of a voltage source (e.g. Vin,b). The system may include a third (e.g. C) phase switch group (e.g. switches S1c and S2c) connected to a third node from connector 110 to receive power from a third phase of a voltage source (e.g. Vin,c).

The battery charger 100 may include a controller 300 (see FIG. 3) configured to control an operation of the first, second, and third phase switch groups (e.g. S1a and S2a, S1b and S2b, and S1c and S2c).

DC-DC converter 130 may be connected to outputs of the first, second, and third phase switch groups. A voltage source may be connected to one or more of the first, second, and third nodes of the PFC converter 120, and a battery 140 may be connected to an output of the DC-DC converter 130. Additionally, a filter 160 may be provided between the DC-DC converter 130 and battery 140.

The battery charger 100 may operate bidirectionally. A vehicle to grid (V2G) operation may be achieved with a designed control strategy for multiple voltages. The PFC converter 120 may be configured to receive DC power from the battery 140 through the DC-DC converter 130, convert the DC power to AC power, and provide the AC power through one or more of the first, second, and third nodes. The controller 300 may be designed with an algorithm to control an operation of the first, second, and third phase switch groups to provide the AC power through the one or more of the first, second, and third nodes.

DC-DC converter 130 may include secondary configuration switches 200, first bridge driver 210, first bridge rectifier 220, second bridge rectifier 230, transformer 240, primary configuration switches 250, and second bridge driver 260.

First bridge driver 210 may include first switch 211 (Tp1), second switch 212 (Tp2), third switch 213 (Tp3), and fourth switch 214 (Tp4). Second bridge driver 260 may include first switch 261 (Up1), second switch 262 (Up2), third switch 263 (Up3), and fourth switch 264 (Up4). Each of first bridge driver 210 and second bridge driver 260 may be operated as a full bridge driver or a half bridge driver, and transmit power as a square-wave signal from PFC converter 120 to transformer 240. Transformer 240 may be one or more high-frequency transformers and may be a single transformer with multiple coils or windings, multiple transformers with single coils or windings, or any combination thereof.

Primary configuration switches 250 may include first primary configuration switch 251 (Q1), second primary configuration switch 252 (Q2), and third primary configuration switch 253 (Q3). Primary configuration switches 250 may be open and closed as applicable to configure the first bridge driver 210 and second bridge driver 260 into each of a parallel bridge driver configuration (see FIG. 4), a series bridge driver configuration (see FIG. 6), and a single bridge driver configuration (see FIG. 9). Opening and closing of primary configuration switches 250 may be controlled by controller 300. The controller 300 may control the operation of primary configuration switches 250 based on one or more of a voltage of battery 140, an input grid voltage, a DC link voltage, a power requirement, and a state of charge of battery 140. However, the disclosure is not limited thereto, and controller 300 may control the operation of primary configuration switches 250 based on any appropriate signal.

In the single bridge driver configuration (see FIG. 9), either first bridge driver 210 or second bridge driver 260 may be used without using the other of the first bridge driver 210 or the second bridge driver 260. In the single rectifier configuration, the primary configuration switches 250 and unused first bridge driver 210 or unused second bridge driver 260 may be operated such that all current passes through the first bridge driver 210 in use or second bridge driver 260 in use, and no current passes through the unused first bridge driver 210 or unused second bridge driver 260.

In the parallel bridge driver configuration (see FIG. 4), the primary configuration switches 250 and first bridge driver 210 and second bridge driver 260 may be operated such that current passes through the first bridge driver 210 and second bridge driver 260 in parallel.

In the series bridge driver configuration (see FIG. 6), the primary configuration switches 250 and first bridge driver 210 and second bridge driver 260 may be operated such that current passes through the first bridge driver 210 and second bridge driver 260 in series.

Transformer 240 may be connected to first bridge rectifier 220 and second bridge rectifier 230. The first bridge rectifier 220 may include first switch 221 (Hs1), second switch 222 (Hs2), third switch 223 (Hs3), and fourth switch 224 (Hs4). The second bridge rectifier 230 may include first switch 231 (Gs1), second switch 232 (Gs2), third switch 233 (Gs3), and fourth switch 234 (Gs4). The switches of the first bridge rectifier 220 and the second bridge rectifier 230 may convert the square-wave signal to DC power.

Secondary configuration switches 200 may include first secondary configuration switch 201 (R1), second secondary configuration switch 202 (R2), and third secondary configuration switch 203 (R3). Secondary configuration switches 200 may be open and closed as applicable to configure the first bridge rectifier 220 and the second bridge rectifier 230 into each of a single rectifier configuration (see FIG. 9), a parallel rectifier configuration (see FIG. 4), and a series rectifier configuration (see FIG. 5). Opening and closing of secondary configuration switches 200 may be controlled by controller 300. The controller 300 may control the operation of secondary configuration switches 200 based on one or more of a voltage of battery 140, an input grid voltage, a DC link voltage, a power requirement, and a state of charge of battery 140. However, the disclosure is not limited thereto, and controller 300 may control the operation of secondary configuration switches 200 based on any appropriate signal.

In the single rectifier configuration (see FIG. 9), either first bridge rectifier 220 or second bridge rectifier 230 may be used without using the other of the first bridge rectifier 220 or the second bridge rectifier 230. In the single rectifier configuration, the secondary configuration switches 200 and unused first bridge rectifier 220 or unused second bridge rectifier 230 may be operated such that all current passes through the first bridge rectifier 220 in use or second bridge rectifier 230 in use, and no current passes through the unused first bridge rectifier 220 or unused second bridge rectifier 230.

In the parallel rectifier configuration (see FIG. 4), the secondary configuration switches 200 and first bridge rectifier 220 and second bridge rectifier 230 may be operated such that current passes through the first bridge rectifier 220 and second bridge rectifier 230 in parallel.

In the series rectifier configuration (see FIG. 5), the secondary configuration switches 200 and first bridge rectifier 220 and second bridge rectifier 230 may be operated such that current passes through the first bridge rectifier 220 and second bridge rectifier 230 in series.

FIG. 2 illustrates two bridge drivers, first bridge driver 210 and second bridge driver 260, with primary configuration switches 250 on a primary side of transformer 240. However, DC-DC converter 130 may include more than two bridge drivers on a primary side of transformer 240 with any number of primary configuration switches 250 as needed to meet requirements of the battery charger 100. FIG. 2 illustrates two bridge rectifiers, first bridge rectifier 220 and second bridge rectifier 230, with secondary configuration switches 200 on a secondary side of transformer 240. However, DC-DC converter 130 may include more than two bridge rectifiers on a secondary side of transformer 240 with any number of secondary configuration switches 200 as needed to meet requirements of the battery charger 100.

The controller 300 may be designed with and/or configured to run an algorithm for control of the first, second, and third phase switches, primary configuration switches 250, switches of the first bridge driver 210, switches of the second bridge driver 260, secondary configuration switches 200, switches of the first bridge rectifier 220, and switches of the second bridge rectifier 230.

Figure 3:
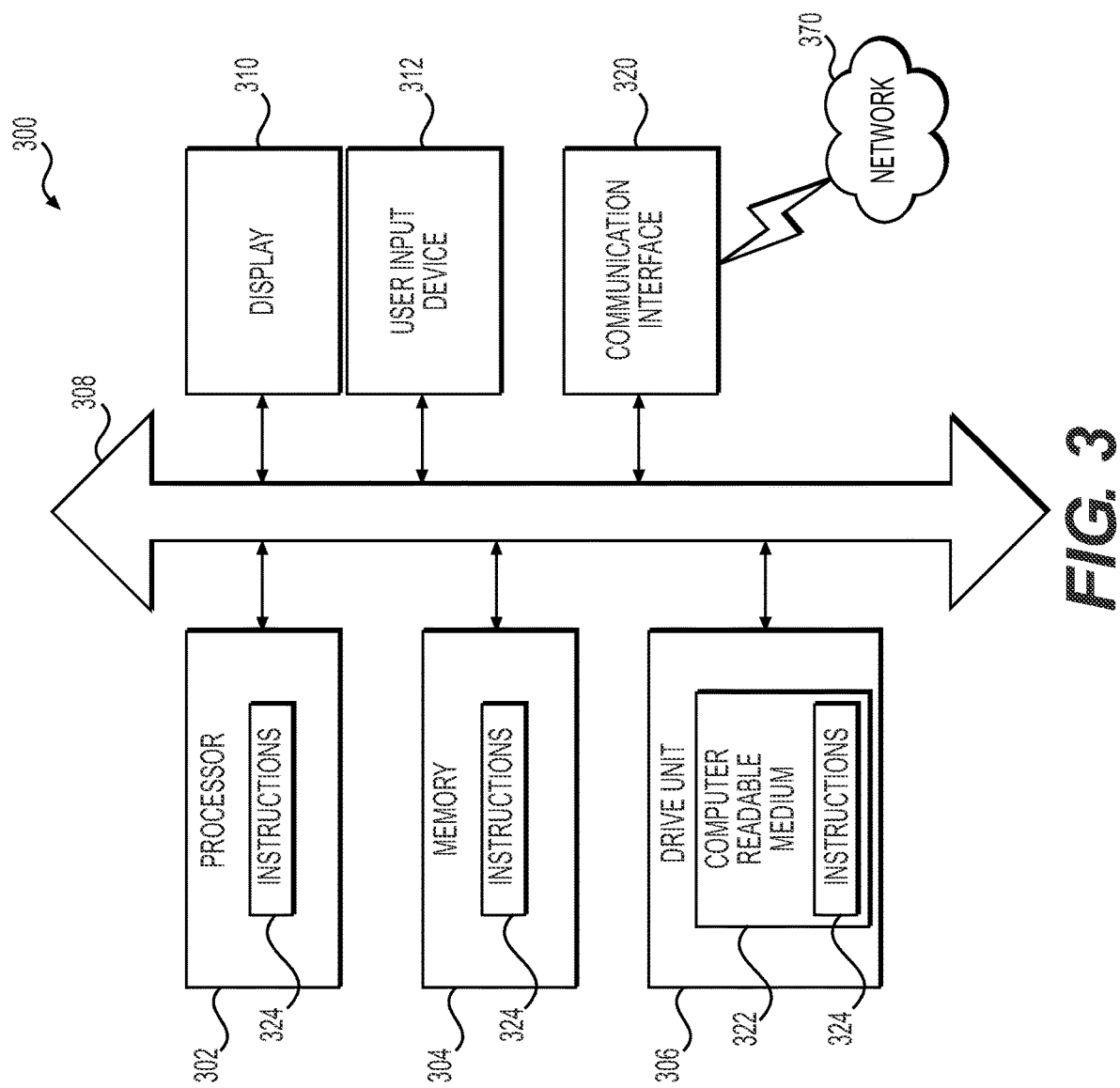
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
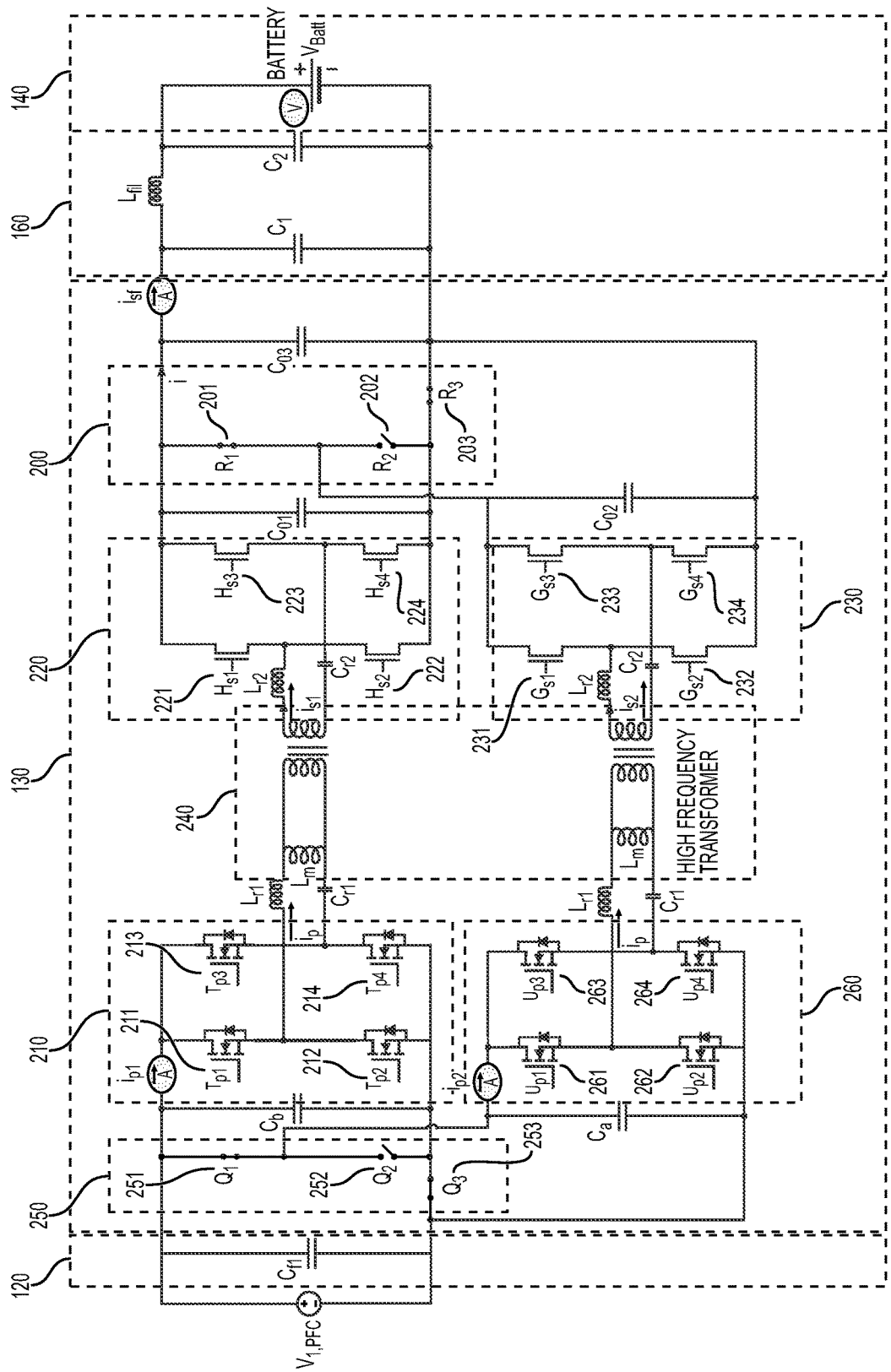
FIG. 4 depicts an exemplary electrical schematic for a battery charger with a configurable DC-DC converter in a parallel full bridge driver primary, parallel rectifier secondary operation, according to one or more embodiments.

FIG. 4 depicts an exemplary electrical schematic for a battery charger with a configurable DC-DC converter in a parallel full bridge driver primary, parallel rectifier secondary operation, according to one or more embodiments. The structure of battery charger 100 is described above, with reference to FIG. 2.

As shown in FIG. 4, battery charger 100 may be configured to operate in a parallel full bridge driver configuration on a primary side of transformer 240, and a parallel rectifier configuration on a secondary side of transformer 240. For the parallel full bridge driver primary, parallel rectifier secondary operation, first primary configuration switch 251 may be closed (turned on), second primary configuration switch 252 may be open (turned off), and third primary configuration switch 253 may be closed. For the parallel full bridge driver primary, parallel rectifier secondary operation, first secondary configuration switch 201 may be closed (turned on), second secondary configuration switch 202 may be open (turned off), and third secondary configuration switch 203 may be closed. For example, the parallel full bridge driver primary, parallel rectifier secondary operation may be used in a low voltage region 1110 and/or a nominal voltage region 1120 (see FIG. 11) when a voltage of battery 140 ranges from 360 V to 450 V or from 450 V to 650 V, for example. However, the disclosure is not limited thereto. The parallel full bridge driver primary, parallel rectifier secondary operation may be used for any operation of the battery charger 100 as desired, and the low voltage region 1110 and/or the nominal voltage region 1120 may range between any appropriate voltage levels.

Figure 5:
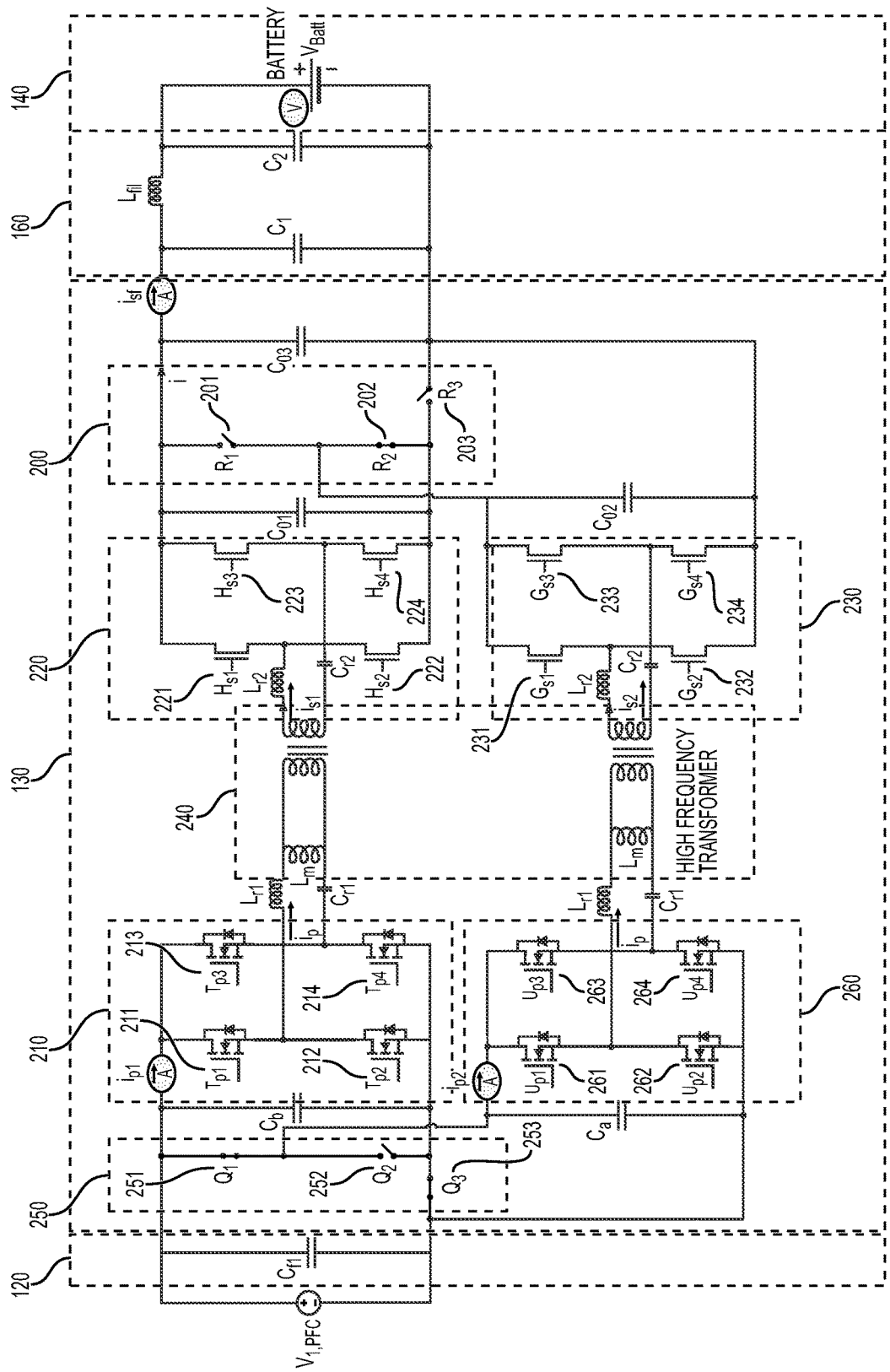
FIG. 5 depicts an exemplary electrical schematic for a battery charger with a configurable DC-DC converter in a parallel full bridge driver primary, series rectifier secondary operation, according to one or more embodiments.

FIG. 5 depicts an exemplary electrical schematic for a battery charger with a configurable DC-DC converter in a parallel full bridge driver primary, series rectifier secondary operation, according to one or more embodiments. The structure of battery charger 100 is described above, with reference to FIG. 2.

As shown in FIG. 5, battery charger 100 may be configured to operate in a parallel full bridge driver configuration on a primary side of transformer 240, and a series rectifier configuration on a secondary side of transformer 240. For the parallel full bridge driver primary, series rectifier secondary operation, first primary configuration switch 251 may be closed (turned on), second primary configuration switch 252 may be open (turned off), and third primary configuration switch 253 may be closed. For the parallel full bridge driver primary, series rectifier secondary operation, first secondary configuration switch 201 may be open (turned off), second secondary configuration switch 202 may be closed (turned on), and third secondary configuration switch 203 may be open. For example, the parallel full bridge driver primary, series rectifier secondary operation may be used in a full voltage region 1130 (see FIG. 11) when a voltage of battery 140 ranges from 650 V to 850 V, for example. However, the disclosure is not limited thereto. The parallel full bridge driver primary, series rectifier secondary operation may be used for any operation of the battery charger 100 as desired, and the full voltage region 1130 may range between any appropriate voltage levels.

Figure 6:
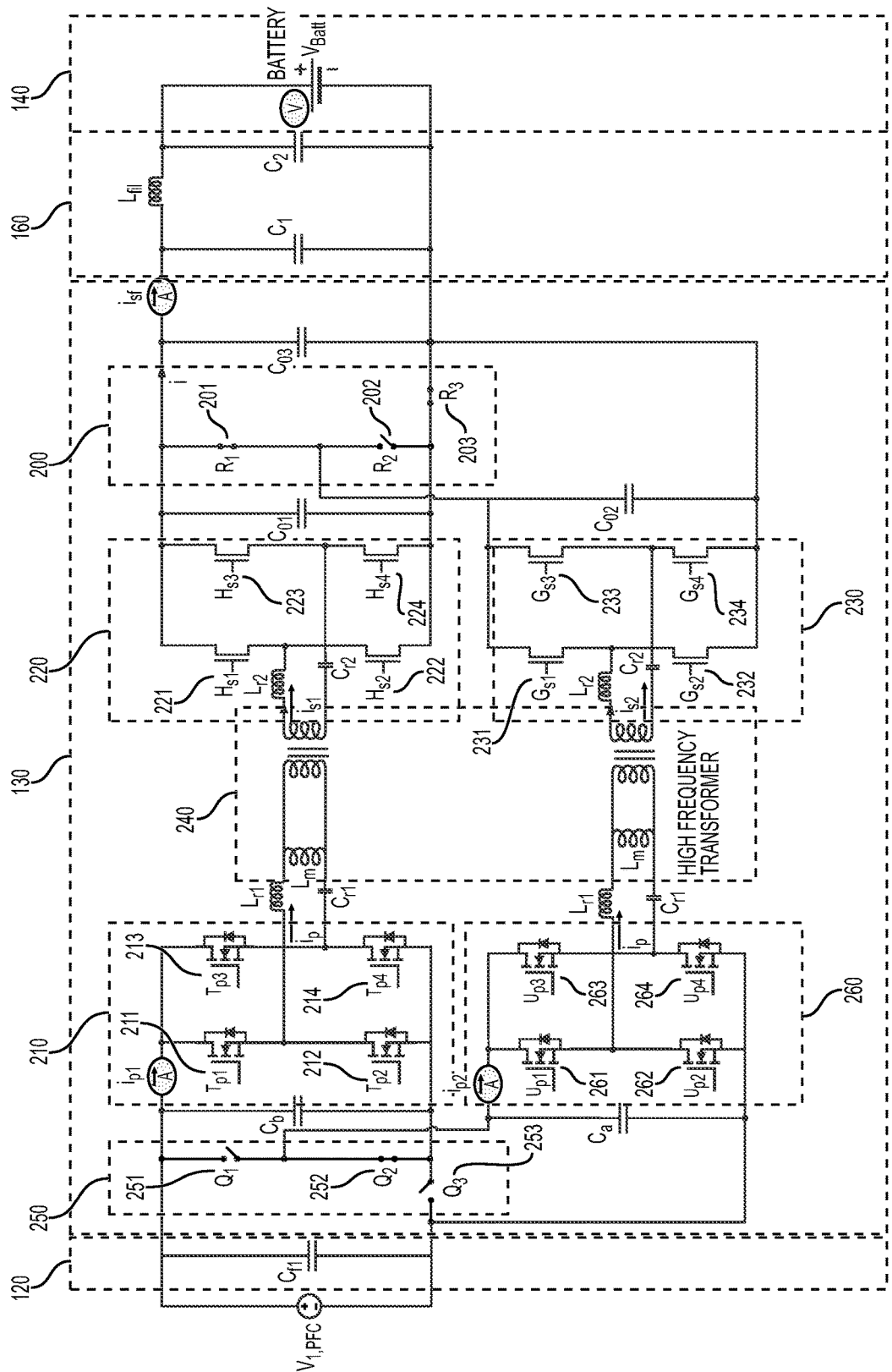
FIG. 6 depicts an exemplary electrical schematic for a battery charger with a configurable DC-DC converter in a series full bridge driver primary, parallel rectifier secondary operation, according to one or more embodiments.

FIG. 6 depicts an exemplary electrical schematic for a battery charger with a configurable DC-DC converter in a series full bridge driver primary, parallel rectifier secondary operation, according to one or more embodiments. The structure of battery charger 100 is described above, with reference to FIG. 2.

As shown in FIG. 6, battery charger 100 may be configured to operate in a series full bridge driver configuration on a primary side of transformer 240, and a parallel rectifier configuration on a secondary side of transformer 240. For the series full bridge driver primary, parallel rectifier secondary operation, first primary configuration switch 251 may be open (turned off), second primary configuration switch 252 may be closed (turned on), and third primary configuration switch 253 may be open. For the series full bridge driver primary, parallel rectifier secondary operation, first secondary configuration switch 201 may be closed (turned on), second secondary configuration switch 202 may be open (turned off), and third secondary configuration switch 203 may be closed. For example, the series full bridge driver primary, parallel rectifier secondary operation may be used in a nominal voltage region 1120 (see FIG. 11) when a voltage of battery 140 ranges from 450 V to 650 V, for example. However, the disclosure is not limited thereto. The series full bridge driver primary, parallel rectifier secondary operation may be used for any operation of the battery charger 100 as desired, and the nominal voltage region 1120 may range between any appropriate voltage levels.

Figure 7:
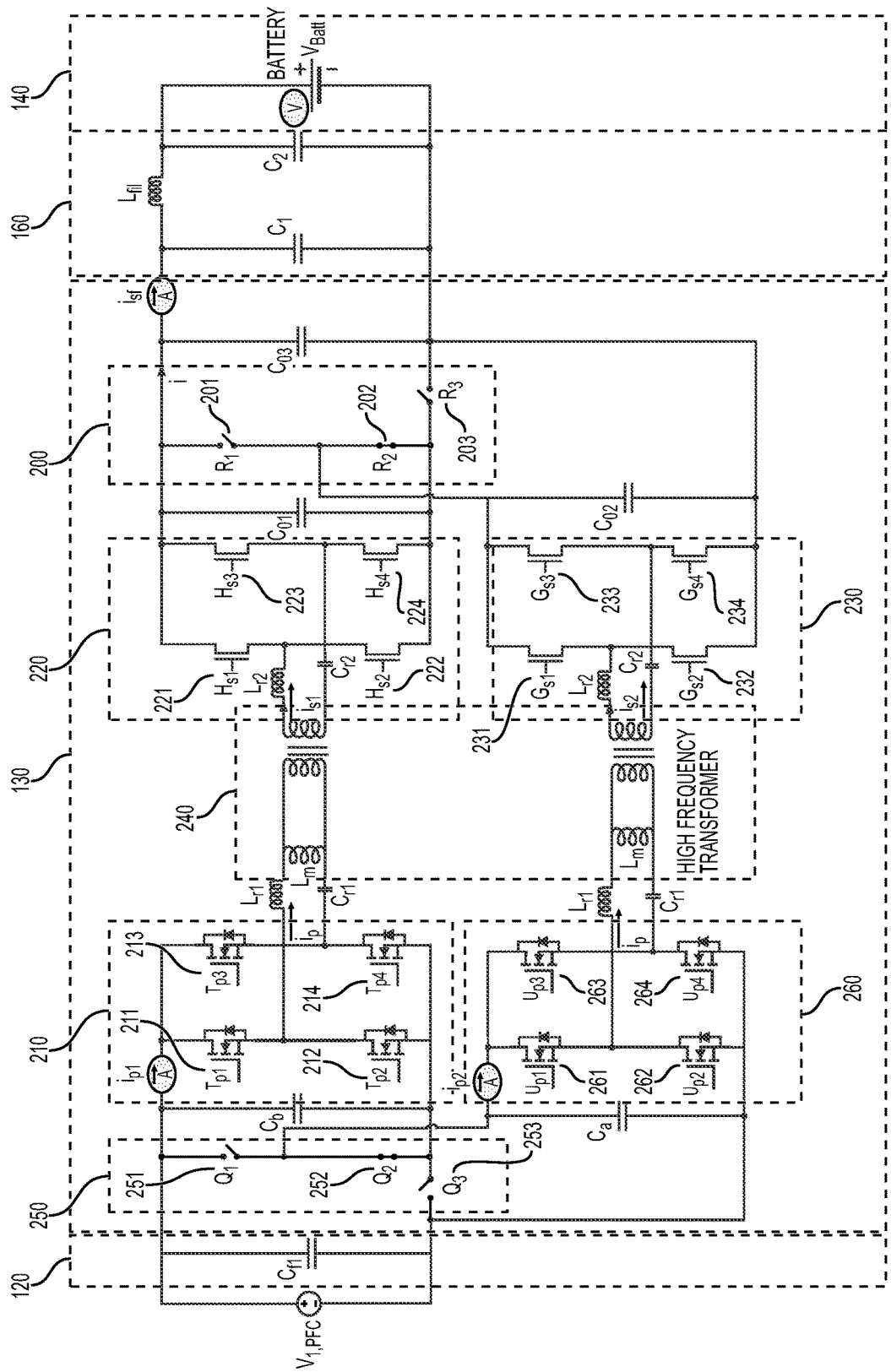
FIG. 7 depicts an exemplary electrical schematic for a battery charger with a configurable DC-DC converter in a series full bridge driver primary, series rectifier secondary operation, according to one or more embodiments.

FIG. 7 depicts an exemplary electrical schematic for a battery charger with a configurable DC-DC converter in a series full bridge driver primary, series rectifier secondary operation, according to one or more embodiments. The structure of battery charger 100 is described above, with reference to FIG. 2.

As shown in FIG. 7, battery charger 100 may be configured to operate in a series full bridge driver configuration on a primary side of transformer 240, and a series rectifier configuration on a secondary side of transformer 240. For the series full bridge driver primary, series rectifier secondary operation, first primary configuration switch 251 may be open (turned off), second primary configuration switch 252 may be closed (turned on), and third primary configuration switch 253 may be open. For the series full bridge driver primary, series rectifier secondary operation, first secondary configuration switch 201 may be open (turned off), second secondary configuration switch 202 may be closed (turned on), and third secondary configuration switch 203 may be open. For example, the series full bridge driver primary, series rectifier secondary operation may be used in a full voltage region 1130 (see FIG. 11) when a voltage of battery 140 ranges from 650 V to 850 V, for example. However, the disclosure is not limited thereto. The series full bridge driver primary, series rectifier secondary operation may be used for any operation of the battery charger 100 as desired, and the full voltage region 1130 may range between any appropriate voltage levels.

Figure 8:
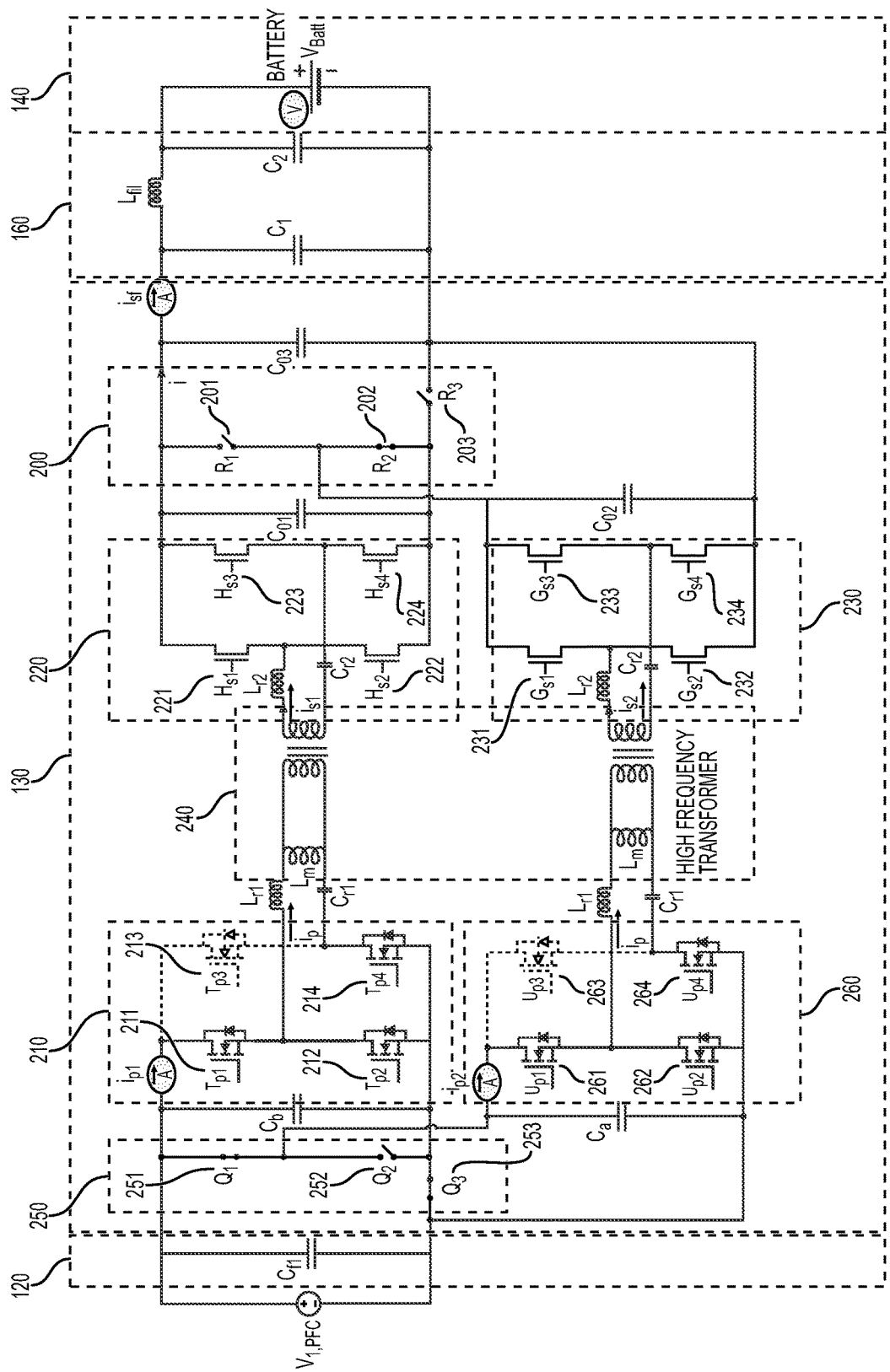
FIG. 8 depicts an exemplary electrical schematic for a battery charger with a configurable DC-DC converter in a parallel half bridge driver primary, series rectifier secondary operation, according to one or more embodiments.

FIG. 8 depicts an exemplary electrical schematic for a battery charger with a configurable DC-DC converter in a parallel half bridge driver primary, series rectifier secondary operation, according to one or more embodiments. The structure of battery charger 100 is described above, with reference to FIG. 2.

As shown in FIG. 8, battery charger 100 may be configured to operate in a parallel half bridge driver configuration on a primary side of transformer 240, and a series rectifier configuration on a secondary side of transformer 240. For the parallel half bridge driver primary, series rectifier secondary operation, first primary configuration switch 251 may be closed (turned on), second primary configuration switch 252 may be open (turned off), and third primary configuration switch 253 may be closed. For the parallel half bridge driver primary, series rectifier secondary operation, first secondary configuration switch 201 may be open (turned off), second secondary configuration switch 202 may be closed (turned on), and third secondary configuration switch 203 may be open. For the parallel half bridge driver primary, switches of first bridge driver 210 may be controlled so that first switch 211 and second switch 212 are operated to generate a voltage signal, third switch 213 is open, and fourth switch 214 is closed. For the parallel half bridge driver primary, switches of second bridge driver 260 may be controlled so that first switch 261 and second switch 262 are operated to generate a voltage signal, third switch 263 is open, and fourth switch 264 is closed. For example, the parallel half bridge driver primary, series rectifier secondary operation may be used in a low voltage region 1110 (see FIG. 11) when a voltage of battery 140 ranges from 360 V to 450 V, for example. However, the disclosure is not limited thereto. The parallel half bridge driver primary, series rectifier secondary operation may be used for any operation of the battery charger 100 as desired, and the low voltage region 1110 may range between any appropriate voltage levels.

Figure 9:
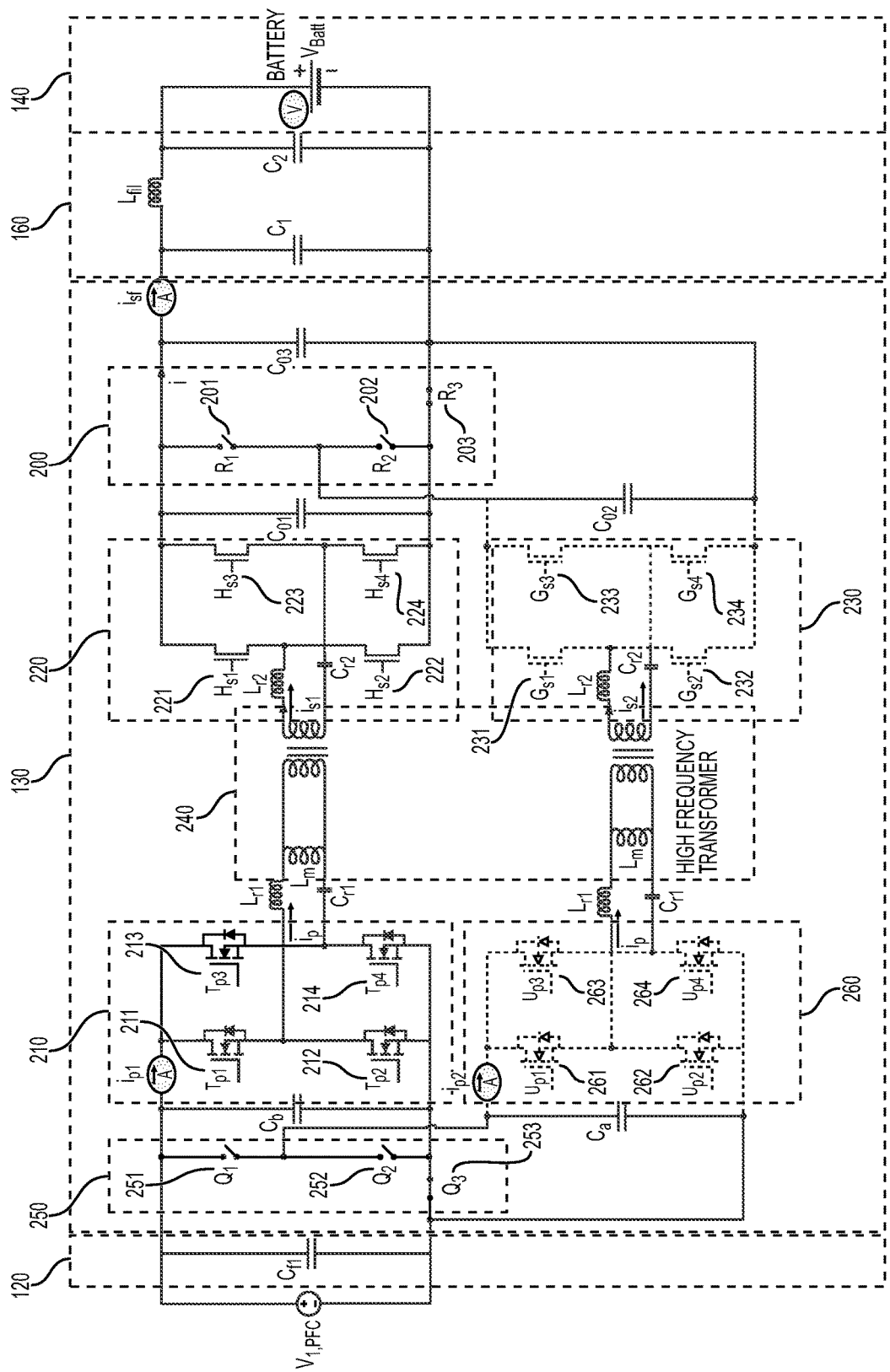
FIG. 9 depicts an exemplary electrical schematic for a battery charger with a configurable DC-DC converter in a single full bridge driver primary, single rectifier secondary operation, according to one or more embodiments.

FIG. 9 depicts an exemplary electrical schematic for a battery charger with a configurable DC-DC converter in a single full bridge driver primary, single rectifier secondary operation, according to one or more embodiments. The structure of battery charger 100 is described above, with reference to FIG. 2.

As shown in FIG. 9, battery charger 100 may be configured to operate in a single full bridge driver configuration on a primary side of transformer 240, and a single rectifier configuration on a secondary side of transformer 240. For the single full bridge driver primary, single rectifier secondary operation, first primary configuration switch 251 may be open (turned off), second primary configuration switch 252 may be open, and third primary configuration switch 253 may be closed (turned on). Also, second bridge driver 260 switches, including first switch 261, second switch 262, third switch 263, and fourth switch 264, may be turned off. For the single full bridge driver primary, single rectifier secondary operation, first secondary configuration switch 201 may be open (turned off), second secondary configuration switch 202 may be open, and third secondary configuration switch 203 may be closed (turned on). Also, second bridge rectifier 230 switches, including first switch 231, second switch 232, third switch 233, and fourth switch 234, may be turned off. For example, the single full bridge driver primary, single rectifier secondary operation may be used in a low voltage region 1110 (see FIG. 11) when a voltage of battery 140 ranges from 360 V to 450 V, for example. However, the disclosure is not limited thereto. The single full bridge driver primary, single rectifier secondary operation may be used for any operation of the battery charger 100 as desired, and the low voltage region 1110 may range between any appropriate voltage levels.

Additionally or alternatively, the second bridge driver 260 may be used as the single bridge driver. Here, rather than turning off the second bridge driver 260 switches, the first bridge driver 210 switches, including first switch 211, second switch 212, third switch 213, and fourth switch 214, may be turned off. When the second bridge driver 260 is used as the single bridge driver and the first bridge driver 210 switches are turned off, first primary configuration switch 251 may be closed (turned on), second primary configuration switch 252 may be open (turned off), and third primary configuration switch 253 may be open.

Additionally or alternatively, the second bridge rectifier 230 may be used as the single rectifier. Here, rather than turning off the second bridge rectifier 230 switches, the first bridge rectifier 220 switches, including first switch 221, second switch 222, third switch 223, and fourth switch 224, may be turned off. When the second bridge rectifier 230 is used as the single rectifier and the first bridge rectifier 220 switches are turned off, first secondary configuration switch 201 may be closed (turned on), second secondary configuration switch 202 may be open (turned off), and third secondary configuration switch 203 may be open.

Additionally or alternatively, for a single bridge driver configuration, the primary configuration switches 250 may be operated to configure bridge drivers 210 and 260 in a series full bridge driver configuration (see FIG. 7) and turning on all switches in either the first bridge driver 210 or the second bridge driver 260.

As shown above, the primary configuration switches 250 in combination with the bridge driver switches 210 and 260 may be operated to use either the first bridge driver 210 or the second bridge driver 260 as the single bridge driver, and the secondary configuration switches 200 in combination with the bridge rectifier switches 220 and 230 may be operated to use either the first bridge rectifier 220 or the second bridge rectifier 230 as the single rectifier.

FIG. 10 depicts a variety of example configurations for a battery charger with a configurable DC-DC converter, according to one or more embodiments. The structure of battery charger 100 is described above, with reference to FIG. 2.

As shown in FIG. 10, the battery charger 100 with a configurable DC-DC converter 130 includes various combinations 1000 of configurations. On a primary side of DC-DC converter 130, primary configuration switches 250 may be controlled to operate first bridge driver 210 and second bridge driver 260 in a single, series, or parallel configuration. Additionally, first bridge driver 210 and second bridge driver 260 may be controlled to operate in a full bridge or half bridge configuration. On a secondary side of DC-DC converter 130, secondary configuration switches 200 may be controlled to operate first bridge rectifier 220 and second bridge rectifier 230 in a single, series, or parallel configuration. Additionally, first bridge rectifier 220 and second bridge rectifier 230 may be controlled to operate in a full bridge or half bridge configuration. In FIG. 10, several examples of different configurations of DC-DC converter 130 and battery charger 100 are provided. However, the disclosure is not limited to the examples provided in FIG. 10.

Figure 11:
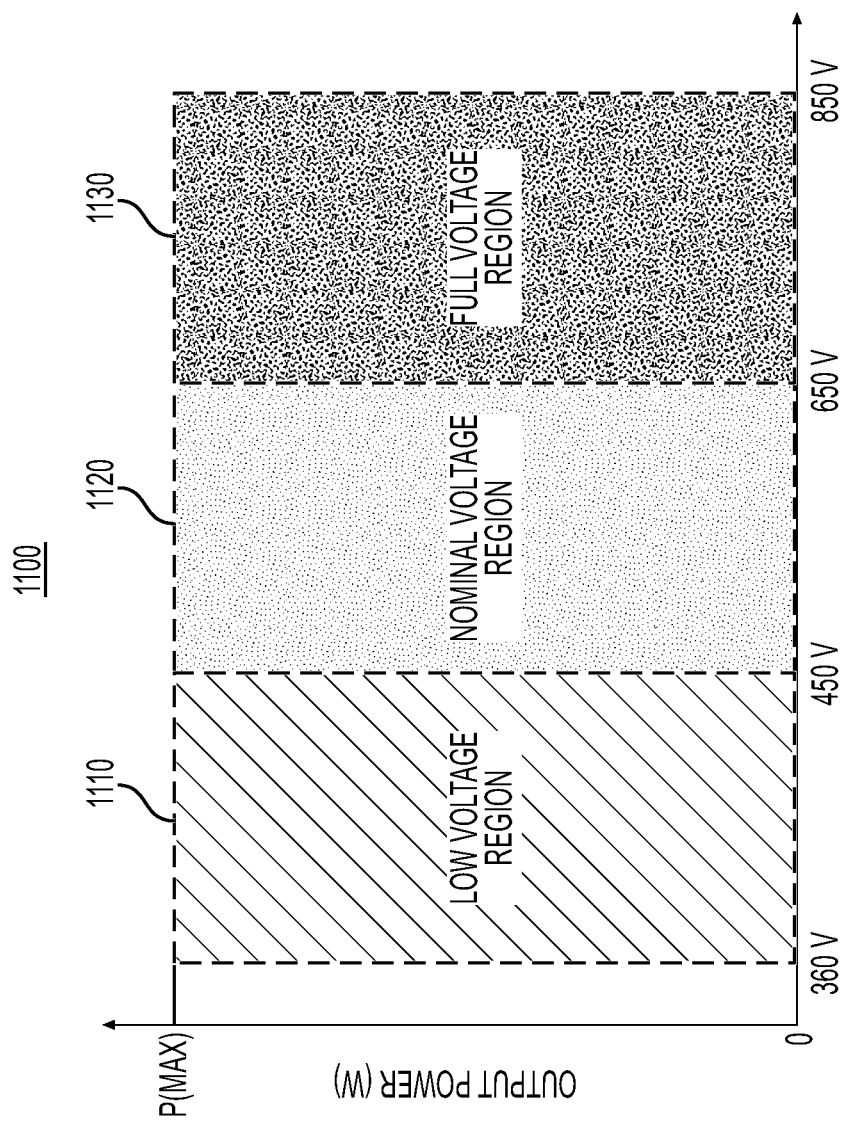
FIG. 11 depicts an exemplary voltage operation control for a battery charger with a configurable DC-DC converter, according to one or more embodiments.

FIG. 11 depicts an exemplary operation control 1100 for a battery charger with a configurable DC-DC converter, according to one or more embodiments. The structure of battery charger 100 is described above, with reference to FIG. 2.

As shown in the examples in FIGS. 10 and 11, battery charger 100 and DC-DC converter 130 may be operated in different configurations based on different battery voltages. For example, DC-DC converter 130 may be operated in a parallel half bridge driver primary, series full bridge rectifier secondary configuration in a low voltage region 1110 when a voltage of battery 140 is in a first range from 360 V to 450 V. DC-DC converter 130 may be operated in a series full bridge driver primary, parallel full bridge rectifier secondary configuration in a nominal voltage region 1120 when a voltage of battery 140 is in a second range from 450 V to 650 V. DC-DC converter 130 may be operated in a series full bridge driver primary, series full bridge rectifier secondary configuration in a full voltage region 1130 when a voltage of battery 140 is in a third range from 650 V to 850 V. Here, the first range as low voltage region 1110, the second range as nominal voltage region 1120, and the third range as full voltage region 1130 are provided as non-overlapping ranges increasing from smallest to largest voltage values. However, these are merely examples, and the disclosure is not limited to the configurations or voltage levels described above.

Figure 12:
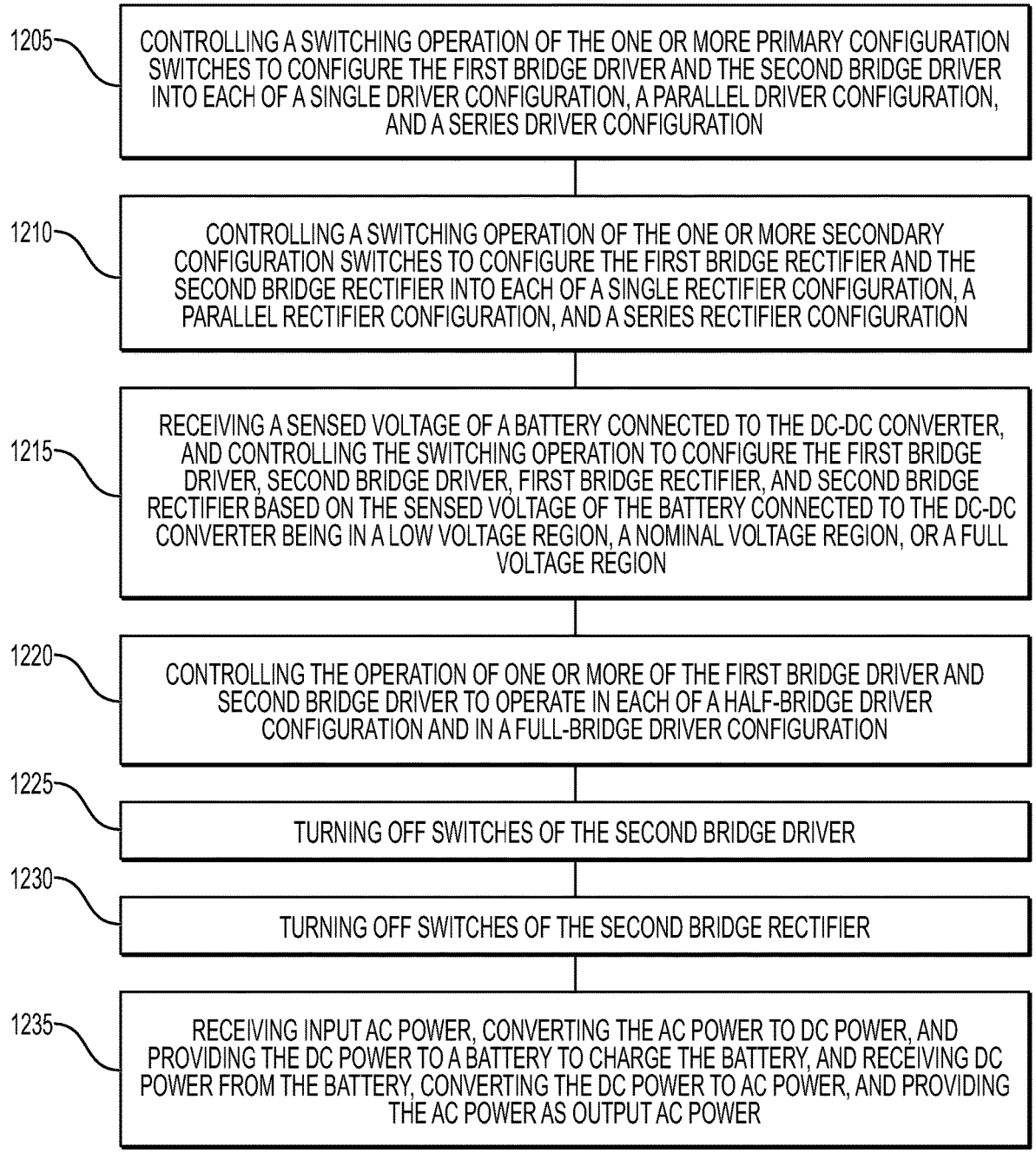
FIG. 12 depicts a flowchart of a method of operating a battery charger with a configurable DC-DC converter, according to one or more embodiments.

FIG. 12 depicts a flowchart of a method of operating a battery charger with a configurable DC-DC converter, according to one or more embodiments.

Method 1200 may control a system including DC-DC converter 130 and may include performing, by controller 300, various operations of method 1200. Operation 1205 may include controlling a switching operation of the one or more primary configuration switches 250 to configure the first bridge driver 210 and the second bridge driver 260 into each of a single driver configuration, a parallel driver configuration, and a series driver configuration. Operation 1210 may include controlling a switching operation of the one or more secondary configuration switches 200 to configure the first bridge rectifier 220 and the second bridge rectifier 230 into each of a single rectifier configuration, a parallel rectifier configuration, and a series rectifier configuration. Operation 1215 may include receiving a sensed voltage of a battery 140 connected to the DC-DC converter 130, and controlling the switching operation to configure the first bridge driver 210, second bridge driver 260, first bridge rectifier 220, and second bridge rectifier 230 based on the sensed voltage of the battery 140 connected to the DC-DC converter 130 being in a low voltage region 1110, a nominal voltage region 1120, or a full voltage region 1130. Operation 1220 may include controlling the operation one or more of the first bridge driver 210 and second bridge driver 260 to operate in each of a half-bridge driver configuration and in a full-bridge driver configuration. Operation 1225 may include controlling the switching operation of the one or more primary configuration switches 250 to configure the first bridge driver 210 and the second bridge driver 260 in the single driver configuration includes turning off switches of the second bridge driver 260. Operation 1230 may include controlling the switching operation of the one or more secondary configuration switches 200 to configure the first bridge rectifier 220 and the second bridge rectifier 230 in the single rectifier configuration includes turning off switches of the second bridge rectifier 230. Operation 1235 may include receiving input AC power, converting the AC power to DC power, and providing the DC power to a battery 140 to charge the battery 140, and receiving DC power from the battery 140, converting the DC power to AC power, and providing the AC power as output AC power.

Above, several examples of different configurations of DC-DC converter 130 and battery charger 100 are provided. However, the disclosure is not limited to the examples provided above. Any switch combination of one or more primary configuration switches 250 for first bridge driver 210 and second bridge driver 260 on the primary side of transformer 240 to configure the primary side of transformer 240 into each of a single, parallel, and series driver configuration and configuring the primary side of transformer 240 in each of a full bridge driver and half bridge driver configuration may be combined with any switch combination of one or more secondary configuration switches 200 for first bridge rectifier 220 and the second bridge rectifier 230 on the secondary side of transformer 240 to configure the secondary side of transformer 240 into each of a single, parallel, and series rectifier configuration and configuring the secondary side of transformer 240 in each of a full bridge rectifier and half bridge rectifier configuration. Additionally, any appropriate voltages or other signals may be used to control the operation of the switches discussed above. For example, to control the operation of the switches discussed above, controller 300 may perform one or more operations of comparing a voltage of battery 140 with one or more reference battery voltages (for example, 360 V, 450 V, and/or 650 V), comparing a DC link voltage (for example, at capacitor Cpfc) with one or more reference operating voltages (for example, 450 V and/or 850 V), or comparing a power required during an operation of the DC-DC converter 130 with a lower reference power (for example, 3 kW) and an upper reference power (for example, 20 kW). However, the disclosure is not limited to the examples provided above.

A battery charger 100 according to the disclosure may operate with multiple types of AC input power supplies, including single phase, split/dual/two phase, and three-phase power supplies. The battery charger 100 may be compatible with a wide range of operation. The algorithms may ensure the operation of the DC-DC converter 130 with wide variations in input voltages to generate a wide range of output voltages. By providing different configurations, the battery charger 100 may reduce current delivered to individual devices of battery charger 100 to reduce stress on the devices. A battery charger 100 according to the disclosure may attain lower voltage across each switch with enhanced performance. This lower voltage across each switch allows the use of lower voltage devices on first bridge driver 210, second bridge driver 260, first bridge rectifier 220, and second bridge rectifier 230.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for a direct current (DC) to DC converter, the system comprising:
   one or more transformers;
   a first bridge driver connected to a primary side of the one or more transformers;
   a second bridge driver connected to a primary side of the one or more transformers;
   one or more primary configuration switches operable to configure the first bridge driver and the second bridge driver into each of a single driver configuration, a parallel driver configuration, and a series driver configuration;
   a first bridge rectifier connected to a secondary side of the one or more transformers;
   a second bridge rectifier connected to the secondary side of the one or more transformers; and
   one or more secondary configuration switches operable to configure the first bridge rectifier and the second bridge rectifier into each of a single rectifier configuration, a parallel rectifier configuration, and a series rectifier configuration.

2. The system of claim 1, further comprising:
   a controller configured to control the operation of the one or more primary configuration switches and the one or more secondary configuration switches.

3. The system of claim 2, wherein the one or more primary configuration switches include a first primary configuration switch, a second primary configuration switch, and a third primary configuration switch, and
   the one or more secondary configuration switches include a first secondary configuration switch, a second secondary configuration switch, and a third secondary configuration switch.

4. The system of claim 3, wherein the controller is configured to control the operation of the one or more primary configuration switches to configure the first bridge driver and the second bridge driver in the single driver configuration by controlling the first primary configuration switch to be open, the second primary configuration switch to be open, and the third primary configuration switch to be closed.

5. The system of claim 3, wherein the controller is configured to control the operation of the one or more primary configuration switches to configure the first bridge driver and the second bridge driver in the parallel driver configuration by controlling the first primary configuration switch to be closed, the second primary configuration switch to be open, and the third primary configuration switch to be closed.

6. The system of claim 3, wherein the controller is configured to control the operation of the one or more primary configuration switches to configure the first bridge driver and the second bridge driver in the series driver configuration by controlling the first primary configuration switch to be open, the second primary configuration switch to be closed, and the third primary configuration switch to be open.

7. The system of claim 3, wherein the controller is configured to control the operation of the one or more secondary configuration switches to configure the first bridge rectifier and the second bridge rectifier in the single rectifier configuration by controlling the first secondary configuration switch to be open, the second secondary configuration switch to be open, and the third secondary configuration switch to be closed.

8. The system of claim 3, wherein the controller is configured to control the operation of the one or more secondary configuration switches to configure the first bridge rectifier and the second bridge rectifier in the parallel rectifier configuration by controlling the first secondary configuration switch to be closed, the second secondary configuration switch to be open, and the third secondary configuration switch to be closed.

9. The system of claim 3, wherein the controller is configured to control the operation of the one or more secondary configuration switches to configure the first bridge rectifier and the second bridge rectifier in the series rectifier configuration by controlling the first secondary configuration switch to be open, the second secondary configuration switch to be closed, and the third secondary configuration switch to be open.

10. The system of claim 2, further comprising:
    wherein the controller is further configured to control the operation of the one or more primary configuration switches and the one or more secondary configuration switches to configure the first bridge driver, second bridge driver, first bridge rectifier, and second bridge rectifier based on a sensed voltage of a battery connected to the DC-DC converter being in a low voltage region, a nominal voltage region, or a full voltage region.

11. The system of claim 2, wherein the controller is further configured to control the operation of one or more of the first bridge driver and second bridge driver to operate in each of a half-bridge driver configuration and in a full-bridge driver configuration.

12. The system of claim 2, wherein the controller is further configured to turn off switches of the second bridge driver in the single driver configuration, and to turn off switches of the second bridge rectifier in the single rectifier configuration.

13. The system of claim 1, further comprising:
an alternating current (AC) to direct current (DC) Power Factor Correction (PFC) converter connected to the bridge driver to provide the system as a battery charger, and
a battery connected to the DC-DC converter of the battery charger,
wherein the battery charger is configured to:
receive input AC power through the PFC converter, convert the AC power to DC power, and provide the DC power to the battery to charge the battery, and
receive DC power from the battery through the DC-DC converter, convert the DC power to AC power, and provide the AC power through the PFC converter as output AC power.

14. The system of claim 1, wherein the one or more transformers includes one or more high-frequency transformers provided in a resonant tank including one or more of a multiple winding transformer or multiple transformers.

15. A method for controlling a system including a direct current (DC) to DC converter including one or more transformers, a first bridge driver, a second bridge driver, one or more primary configuration switches, a first bridge rectifier, a second bridge rectifier, and one or more secondary configuration switches, the method comprising performing, by a controller, operations including:
controlling a switching operation of the one or more primary configuration switches to configure the first bridge driver and the second bridge driver into each of a single driver configuration, a parallel driver configuration, and a series driver configuration; and
controlling a switching operation of the one or more secondary configuration switches to configure the first bridge rectifier and the second bridge rectifier into each of a single rectifier configuration, a parallel rectifier configuration, and a series rectifier configuration.

16. The method of claim 15, wherein the operations further include receiving a sensed voltage of a battery connected to the DC-DC converter, and
wherein the controlling the switching operation includes controlling the switching operation to configure the first bridge driver, second bridge driver, first bridge rectifier, and second bridge rectifier based on the sensed voltage of the battery connected to the DC-DC converter being in a low voltage region, a nominal voltage region, or a full voltage region.

17. The method of claim 15, wherein the operations further include controlling the operation of one or more of the first bridge driver and second bridge driver to operate in each of a half-bridge driver configuration and in a full-bridge driver configuration.

18. The method of claim 15, wherein the controlling the switching operation of the one or more primary configuration switches to configure the first bridge driver and the second bridge driver in the single driver configuration includes turning off switches of the second bridge driver, and
wherein the controlling the switching operation of the one or more secondary configuration switches to configure the first bridge rectifier and the second bridge rectifier in the single rectifier configuration includes turning off switches of the second bridge rectifier.

19. The method of claim 15, wherein the controlling the switching operation further includes:
receiving input AC power, converting the AC power to DC power, and providing the DC power to a battery to charge the battery, and
receiving DC power from the battery, converting the DC power to AC power, and providing the AC power as output AC power.

20. A non-transitory computer readable medium storing instructions that, when executed by one or more processors, perform operations including:
controlling a switching operation of one or more primary configuration switches to configure a first bridge driver and a second bridge driver into each of a single driver configuration, a parallel driver configuration, and a series driver configuration; and
controlling a switching operation of one or more secondary configuration switches to configure a first bridge rectifier and a second bridge rectifier into each of a single rectifier configuration, a parallel rectifier configuration, and a series rectifier configuration.

* * * * *